United States Patent Office 2,903,447
Patented Sept. 8, 1959

2,903,447

2,5-DI-PHENYL-PIPERAZINE BIPENICILLINATE G

Jean B. Mathieu, Montfermeil, and Gerard T. Nominé, Noisy-le-Sec, France, assignors to Les Laboratoires Francais de Chimiotherapie, Paris, France, a French body corporate No Drawing. Application January 4, 1956
Serial No. 557,239

Claims priority, application France September 29, 1955

1 Claim. (Cl. 260—239.1)

The present invention relates to a new penicillin compound and to the method of preparing the same. More particularly, the invention relates to the penicillin salt of 2,5-diphenyl-piperazine.

This compound has been found to be of great value in veterinary medicine, in the therapy of humans, in agriculture and in the raising of livestock and other animals.

For similar purposes of application in the afore-listed fields, penicillin salts with various other organic bases, such as benzohydrylamine, procaine, or quinine, have been previously used.

In the herein-claimed penicillin salt of 2,5-diphenyl-piperazine we have discovered a penicillin compound of very low aqueous solubility. Consequently, by means of this new penicillin salt, an effective penicillin concentration can be maintained in the blood stream of animals and humans over a greatly extended period of time. In addition, a great advantage of the penicillin salt of 2,5-diphenyl-piperazine lies in the lack of a sensitizing group on its molecule. One knows, as a matter of fact, that procain penicillin, for example, may induce severe injuries owing to a sensitization of the system to the para-amino group of procain. The new compound permits a rational use of penicillin without risking any trouble. The low solubility in water of the penicillin salt of 2,5-diphenyl-piperazine provides this new product with a clear advantage over the older "delayed-action" forms of this antibiotic. As may be seen from the table below, the herein disclosed product furnishes the physician with a new tool far superior to other compounds of this general type. The greatly delayed action of the new compound permits, in certain cases, the application of a more accurate penicillin dosage and thus avoids the escape of more resistant microbe strains. It also permits to take in consideration certain individual sensitivities, such as allergies for example, while the necessary dosage can nevertheless be applied.

| Penicillin salts of— | aqueous solubility, gr. per liter |
|---|---|
| benzohydrylamine | 6.4 |
| procaine | 4.5 |
| quinine | 2.7 |
| 2,5-diphenyl-piperazine | 0.35 |

It is, therefore, the principal object of the present invention to provide a new pharmaceutical product in the penicillin salt of 2,5-diphenyl-piperazine.

It is another object of the invention to provide a method of preparing this new penicillin salt.

It is a still further object to provide 2,5-diphenyl-piperazine which is a new product in itself and to provide methods of preparing the same.

These and other objects and advantages will appear from the detailed description following hereinafter.

The 2,5-diphenyl-piperazine of this invention, having a M.P. of 195–196° C., is not to be confused with N,N'-diphenyl-piperazine (M.P. 164–165° C.) which has been known for a long time. The 2,5-diphenyl-piperazine of this invention is prepared, for example, by reducing 2,5-diphenyl-dihydro-pyrazine which, in turn, can be readily made as described by Gabriel (Ber., 1908, 41, 1127).

According to the present invention, the penicillin salt of 2,5-diphenyl-piperazine is prepared in an aqueous or hydrocarbon medium, by allowing 2,5-diphenyl-piperazine, dissolved in water or in a water-miscible organic solvent, to react with an aqueous solution of a penicillin salt. According to one preferred mode of carrying out this invention, 2,5-diphenylpiperazine acetate and triethylamine-penicillinate are reacted with each other. The double decomposition is accomplished in aqueous medium and the resulting salt is separated by evaporation, filtration or centrifuging, to be then washed with water and dried. It is quite obvious that these operations must be carried out under sterile conditions if the product thus obtained is to be used therapeutically. Since 2,5-diphenyl-piperazine is capable of binding two penicillin molecules, the new product offers the additional advantage of a very high activity per weight unit and thus permits the use of much smaller quantities to obtain results that formerly have been obtainable only with quantities of other salts which, because of their large size, have been always found difficult to administer.

EXAMPLE 1

*Preparation of 2,5-diphenyl-piperazine, starting from 2,5-diphenyl-dihydro-pyrazine*

50 g. of 2,5-diphenyl-dihydro-pyrazine, prepared according to Gabriel (Ber., 1908, 41, 1127), are dissolved in 450 cc. of formic acid. After adding 5 g. of palladium black containing 2% of palladium, hydrogen gas is passed for six hours through the solution at room temperature. The solution is then filtered in order to remove the palladium black. While stirring and chilling the filtrate in an ice bath in order not to exceed a temperature of 20° C., 1800 cc. of ammonia (22° Bé.) are gradually added over a period of two hours. The resulting precipitate is separated, washed with 300 cc. of water and dried under vacuum. 44 g. (87%) of 2,5-diphenyl-piperazine are obtained. The product is purified by dissolving in 10 volumes of ethanol, adding two volumes of concentrated hydrochloric acid, chilling to 0° C., separating the hydrochloride, dissolving it in 35 volumes of water and precipitating with 2 volumes of ammonia (22° Bé.).

The resulting product is obtained in form of colorless crystals that are difficultly soluble in water, soluble in warm alcohol, insoluble in ether. The M.P. is 195–196° C. The ultraviolet spectrum has three characteristic maxima:

$\epsilon$ 328 at 263.5 m$\mu$
$\epsilon$ 453 at 257.5 m$\mu$
$\epsilon$ 405 at 251.5 m$\mu$

*Analysis.*—$C_{16}H_{18}N_2$=238.3. Calculated: 80.6% C; 7.6% H; 11.7% N. Found: 80.6% C; 7.7% H; 11.7% N.

EXAMPLE 2

*Preparation of 2,5-diphenyl-piperazine, starting from 2,5-diphenyl-pyrazine*

5 g. of 2,5-diphenyl-pyrazine are reduced in 100 volumes of formic acid and in the presence of 0.5 g. of palladium black containing 2% palladium. After fixation of the theoretical amount of hydrogen, the operation is carried out in exactly the same manner as in Example 1.

A product is obtained, at a yield of 85%, that melts at 195–196° C., has all the characteristics of the 2,5-diphenyl-piperazine obtained according to Example 1 and, when mixed therewith, does not cause a depression of the melting point.

EXAMPLE 3

*Preparation of penicillin salt of 2,5-diphenyl-piperazine*

1 g. of 2,5-diphenyl-piperazine, M.P. 195–196° C. (heated block method), prepared according to the preceding examples, is introduced into 100 cc. distilled water, 0.55 cc. glacial acetic acid are added, and the solution is heated in a water bath to a temperature of 60–80° C., until complete dissolution has taken place. After filtration and after it has been allowed to cool to room temperature, the solution is added, while stirring, to a solution of 4 g. of triethylamine penicillinate in 20 cc. of distilled water. The sample is chilled to 10° C. and the resulting crystalline mass is separated and washed with distilled water. Upon drying in vacuo over phosphoric acid, 3.5 g. of 2,5-diphenyl-piperazine-bipenicillinate are obtained, having a M.P. (i) of 219° C. (heated block method: decomposition); $[\alpha]_D^{20} = +212°$ C. $\pm 2$ (c.=1%, dimethylformamide). The yield is 94%. This new product has the form of colorless prismatic needles that are soluble in formamide, dimethylformamide and methoxyethanol. The product is soluble in water to the extent of 0.35 part per 1000 and is insoluble in acetone, alcohol, chloroform, ether and in the other ordinary organic solvents.

*Analysis.*—$C_{48}H_{54}O_8N_6S_2=907$. Calculated: 63.6% C; 6.0% H; 9.2% N; 7.0% S. Found: 63.4% C; 6.0% H; 9.0% N; 7.0% S.

The foregoing examples have been presented to illustrate the invention, but not to limit the scope thereof in any way. Thus, 2,5 - diphenyl-piperazine can be prepared starting from any 2,5-diphenyl-dihydropyrazine. Moreover, it will be obvious that changes can be made in the solvents, reducing agent, temperatures and reaction times without exceeding the scope of this invention. Similarly, in preparing the penicillin salt of 2,5-diphenyl-piperazine, the 2,5-diphenyl-piperazine acetate can be replaced by any other salt of this base that has the desired solubility. Or, triethylamine penicillinate can be replaced by an alkali- or alkali-earth metal compound of penicillin, or by any organic base-metal compound thereof that permits double decomposition. Moreover, we found that it is also possible to react acid penicillin with 2,5-diphenyl-piperazine in the presence of a suitable solvent and to separate the resulting salt by means of a third solvent or by evaporating to dryness, followed by adequate washing, if necessary.

Although the use of a penicillin G salt is generally preferred, it is also possible to employ other penicilline salts, such as F, X, K, V, etc., or mixtures of two or several of these for special requirements.

The new penicillin salt of this invention may be also employed in the manufacture of penicillin, for the separation and purification of the latter.

2,5-diphenyl-piperazine salt of penicillin is usually administered, in human or veterinary medicine, parenterally in form of a suspension in a suitable medium, such as distilled water, a normal salt solution, a 20% propylene glycol solution or any other suitable dilution agent for aqueous media. Moreover, it is possible to use an oil as the vehicle, such as peanut oil, sesame oil, cottonseed oil and other assimilable triglycerides. In these cases it is advisable to follow the prior practice and add to the preparation various agents, such as a stabilizing agent, a thixotropic agent, a viscosity modifier and a wetting agent, in order to impart to the preparation the properties required for injection by means of a hypodermic syringe. The crystals may be crushed beforehand. Moreover, the new salt can be used in other familiar pharmaceutical or commercial forms, such as tablets, pills or together with various liquids or solids intended to be added to animal feed or to be scattered over plants.

We claim:

As a new pharmaceutical product, 2,5-diphenyl-piperazine bipenicillinate G having a melting point of 219° C.

References Cited in the file of this patent

UNITED STATES PATENTS

| | | |
|---|---|---|
| 2,558,014 | Stiller | June 26, 1951 |
| 2,750,379 | Hanslick et al. | June 12, 1956 |

OTHER REFERENCES

Beilstein: Hand. der. Org. Chem., vol. XXIII, p. 221, citing Mason, J. Chem. Soc., 55, pp. 97–107 (1889).

Chem. Abst., vol. 32 (1938), p. 8428.

Kipping: J. Chem. Soc. (London), 1929, pp. 2890 and 2892–2893.

Godchot et al.: Bull. Soc. Chem., vol. 51 (1932), pp. 349–360.